(No Model.) 2 Sheets—Sheet 1.
W. W. GRISCOM.
MEANS FOR PROPELLING VEHICLES BY SECONDARY BATTERIES.
No. 408,232. Patented Aug. 6, 1889.
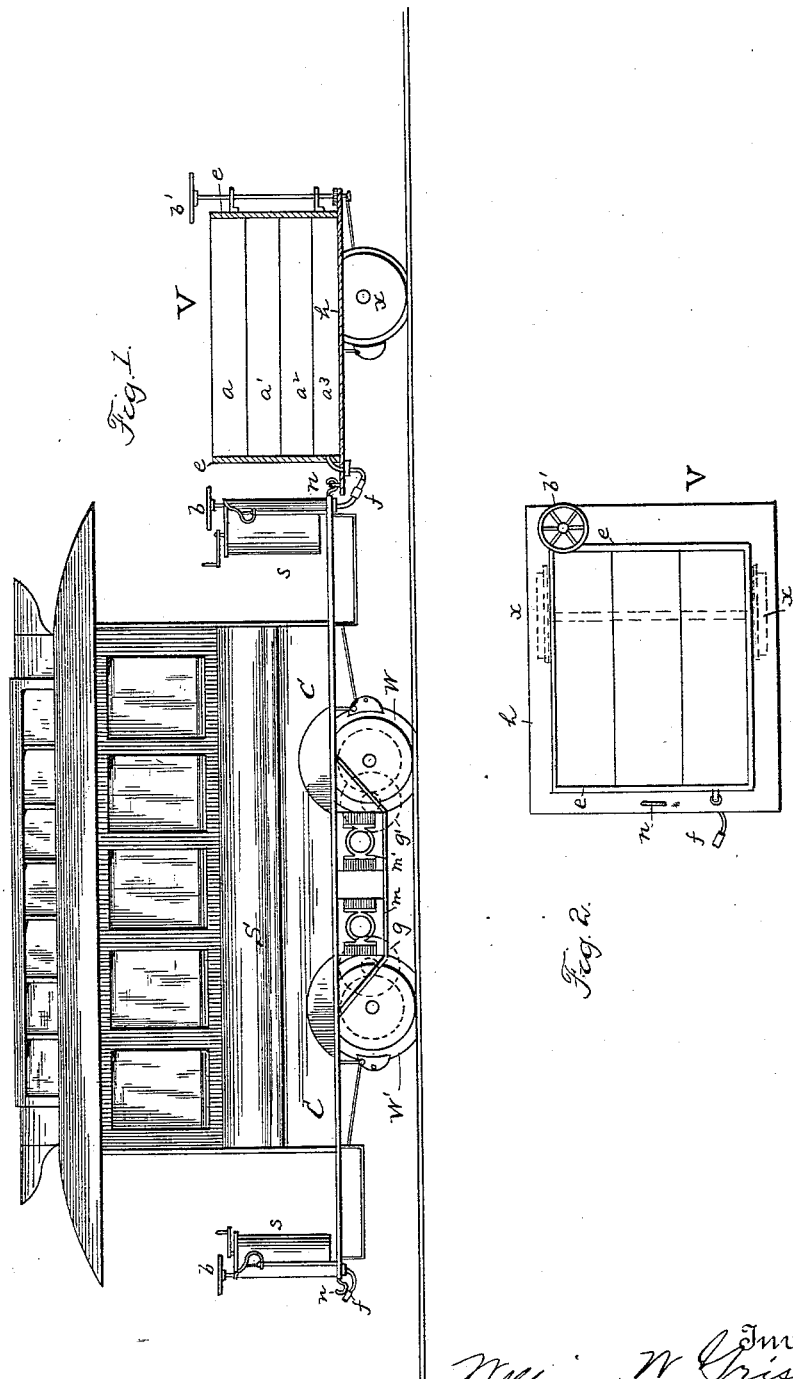

(No Model.) 2 Sheets—Sheet 2.

W. W. GRISCOM.
MEANS FOR PROPELLING VEHICLES BY SECONDARY BATTERIES.

No. 408,232. Patented Aug. 6, 1889.

Fig. 3.

UNITED STATES PATENT OFFICE.

WILLIAM W. GRISCOM, OF HAVERFORD COLLEGE, ASSIGNOR TO THE ELECTRO DYNAMIC COMPANY, OF PHILADELPHIA, PENNSYLVANIA.

MEANS FOR PROPELLING VEHICLES BY SECONDARY BATTERIES.

SPECIFICATION forming part of Letters Patent No. 408,232, dated August 6, 1889.

Application filed April 12, 1889. Serial No. 306,922. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in the Means for Propelling Vehicles by Secondary Batteries, of which the following is a specification.

My invention is an improvement in the means for propelling vehicles by secondary batteries.

The invention comprises the combination of a wheeled vehicle—such as an ordinary street-railway car—upon which are located one or more motors mechanically connected with a wheel or axle thereof. A second wheeled vehicle is coupled with the first vehicle, and upon the floor of this second vehicle are placed a series of parallel rows of secondary batteries. Additional rows of batteries are superposed upon the first series until sufficient electric power is provided. I prefer to take a vehicle having a floor-space about three feet by four feet and locate upon the floor three rows of cells, each of which is composed of twelve cells. By superposing three other rows upon each of the first series of three rows I have four series of cells and thirty-six cells in each series, making one hundred and forty-four in all. This vehicle is mechanically connected with the first-named vehicle and is moved thereby. An electric circuit unites the motor or motors on the first vehicle with the batteries upon the second vehicle, and a switch or circuit-changer, also located upon the first vehicle, serves to change the connection of the motors with respect to the circuit, and also the batteries with respect to said circuit. I prefer to use a flexible connection for completing the connection between the first and second vehicles. For the purpose of increasing the traction or tractive power of the first vehicle, I provide the second vehicle with one pair of wheels only. These are located between the center and the rear end, the object being to give to this second vehicle a tendency to rest upon and be supported through its connection with the first-named vehicle. By this means a considerable portion of the weight of the second vehicle is carried by or supported by the first vehicle, upon which the motors are located. This addition of weight to the first vehicle, it will be readily understood, increases the friction between the rotating wheels and the track.

The great advantage due to the use of this combination of apparatus arises from the fact that the weight of the motors and batteries is distributed over a greater number of points of support than is the case where both motors and batteries are placed upon one vehicle, and when it becomes necessary to recharge the batteries it will be unnecessary to change their location upon the vehicle upon which they are transported, a duplicate vehicle with a duplicate series of cells being always kept at hand ready to be substituted by a very simple and expeditious movement, which consists in breaking the electrical and mechanical connection with one vehicle and restoring such electrical and mechanical connection with the substituted vehicle. A vast amount of time and labor is thus saved, and the storage system may be thus applied to any car, whether such a car is adapted to what is called the "direct system" of electric propulsion or to the ordinary horse-traction vehicle. In placing the batteries in position upon the second vehicle I prefer to arrange them upon the floor entirely inside the plane in which the wheels rotate.

The accompanying drawings illustrate my invention.

Figure 1 shows the railway-car having electric motors thereon and a second wheeled vehicle connected thereto carrying the batteries. Fig. 2 is a plan view showing the superposed rows of batteries located on the floor inside the plane of the wheels. Fig. 3 is a diagrammatic view of the circuits, motors, and switching apparatus.

In Fig. 1, C is an ordinary street-car having longitudinally-arranged seats for passengers S and entrances for passengers from both ends of the car. The running-gear consists of wheels *w w'*, located upon suitably-arranged axles. There are two electric motors *m m'* supported under the floor of the car. These motors are mechanically connected with the wheels $w w'$, respectively, by suitable gearing $g g'$. The car is equipped with the usual friction-brakes $b b$, located on opposite ends. There is also suitable switching apparatus $s$ on each end of the car, equipped with a suitable handle to manipulate it easily. The details of this switching apparatus are more fully shown in Fig. 3, to which reference will be made.

V is a second wheeled vehicle having two wheels $x$, united by a suitable axle. Its floor $h$ is a plane surface and is surrounded by a wall or guard $e$. A suitable friction-brake $b'$ is applied in a well-known manner. On the floor of this second vehicle, entirely inside the plane of the wheels, is a series of battery-cells, preferably arranged in trays or long boxes $a$ $a'$ $a^2$ $a^3$, having suitable covers. Twelve cells is found a convenient number for each box or tray. Three of these boxes are placed side by side on the floor $h$, and upon each of these are superposed three other similar boxes $a'$ $a^2$ $a^3$, making a superposed series of four tiers, three boxes in each tier, the number of cells aggregating one hundred and forty-four.

The vehicle V is linked or mechanically connected to the car C by a connection $n$, and the motors on the car C are connected with the batteries on vehicle V by an electrical circuit through the medium of a flexible connection $f$, electrically uniting car C and vehicle V.

The connection of the circuit with respect to the motors $m m'$, the batteries $a a^3$, and the switching apparatus R and $s$ is shown in Fig. 3. The switch $s$ consists of a series of fixed contact-points connected to the different points in the series of cells. The extreme terminals $p$ are connected to the opposite ends of the entire series of cells, respectively, by wires 4 and 7. The entire series of one hundred and forty-four cells are in two equal divisions, and the divided terminals are connected to adjacent fixed terminals $p'$ by wires 5 and 6. The two central fixed terminals are connected to opposite ends of the motor-circuit 8 9. The cylindrical rotating surface of the switch $s$ is shown produced and bears three rows of contacts $c c' c^2$. When the row of contacts $c$ is in contact with the terminals $p$, the motors are connected with the entire number of cells in series. When the row of contacts $c'$ is in contact with terminals $p$, the motors are connected with one-half the entire number of cells in series. When the row of contacts $c^2$ is in contact with terminals $p$, the motors are connected with two parallel series of batteries, each series being one-half the entire series.

The motors are series-wound, and the armature-coils are connected to two movable contacts of a reversing-switch R by wires 100 and 101. Fixed contacts, forming part of switch R, are connected to opposite ends of the divided circuit 8 9. By operating switch R the current flowing in circuit 8 9 has its direction reversed through that portion of the car-circuit 100 and 101 containing the armature-coils of the motors, whereby the direction of movement of the motors is reversed at the will of the operator, the polarity of the field and armature coils with respect to each other being thus reversed. Referring to the vehicle V, it will be seen that the wheels $x$ are located at one side of a central point of the vehicle. This has a tendency to cause the vehicle to tip down at the connecting end, and consequently when connection is made at $n$ a considerable portion of the weight borne by vehicle V will be placed upon and borne by the car C. This will add to the tractive power of the vehicle carrying the motors, and thus enable it to draw a greater weight. At the same time the entire weight has six points of support instead of four, as has heretofore been the case in cars propelled by secondary batteries.

The operation of this apparatus is evident from the foregoing description. The battery located on the vehicle V is charged by a dynamo at the station. The vehicle V is then moved out and attached to the car. During its trip a second similar vehicle bearing a similar series of cells has such cells charged, and upon the return of the first vehicle V with discharged cells the second is substituted for it without handling the batteries or producing any change except the breaking of the electrical and mechanical connection with one vehicle V and making such connection with the substituted vehicle. Time and labor are saved, the expense of operation is decreased, the useful life of the battery is prolonged by avoiding the jars incident to handling, and the delay at the terminal heretofore incident to the necessary change is avoided.

I do not herein claim the combination of a wheeled vehicle having seats for passengers, one or more electric motors located on said vehicle and mechanically connected with the wheel or axle thereof, a second wheeled vehicle mechanically connected with the first vehicle, a series of secondary batteries located thereon, an electric circuit uniting the motors on one vehicle with the batteries on the other, and suitable switching apparatus for varying the connection of the batteries with respect to said circuit, as that forms the subject-matter of another application for United States Letters Patent filed by me April 5, 1889, Serial No. 306,114.

What I claim, and desire to secure by Letters Patent, is—

The combination of a wheeled vehicle having seats for passengers, one or more electric motors located on said vehicle and mechanically connected with a wheel or axle thereof, a second vehicle having two wheels mechanically connected to and partially supported by the first vehicle, a series of cells of secondary batteries or accumulators located thereon, an electric circuit uniting the motors on one vehicle with the batteries on the other, and suitable switching apparatus for varying the
5 connection of the batteries with respect to said circuit, substantially as described.

Signed at New York city, in the county of New York and State of New York, this 11th day of April, A. D. 1889.

WILLIAM W. GRISCOM.

Witnesses:
 DANIEL E. DELAVAN,
 V. E. SCHAUMBURG.